UNITED STATES PATENT OFFICE.

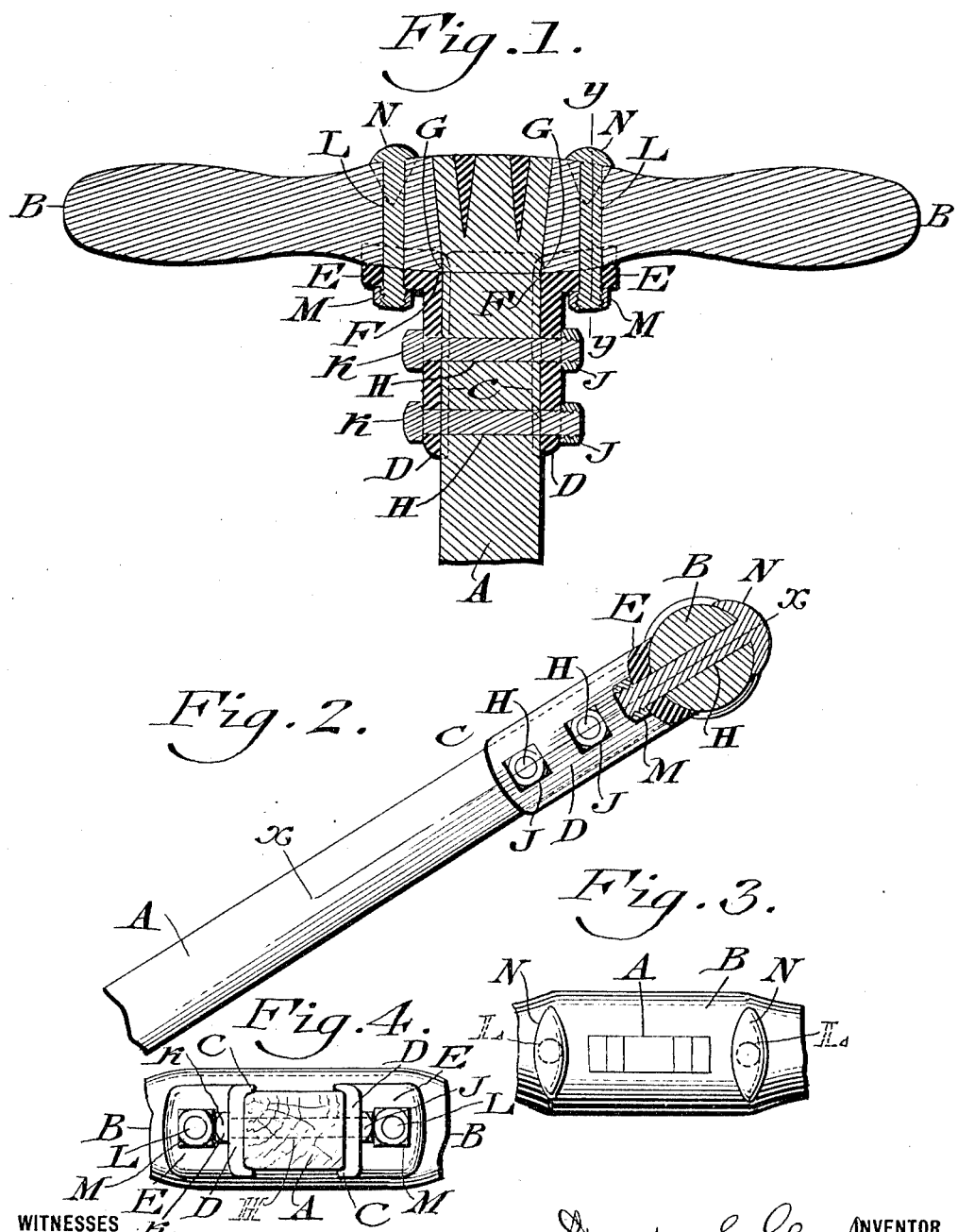

WALTER E. GRAHAM, OF PHILADELPHIA, PENNSYLVANIA.

LAWN-MOWER HANDLE.

1,067,020.          Specification of Letters Patent.          Patented July 8, 1913.

Application filed July 27, 1912.   Serial No. 711,786.

*To all whom it may concern:*

Be it known that I, WALTER E. GRAHAM, a citizen of the United States, residing in the city and county of Philadelphia, State of Pennsylvania, have invented a new and useful Lawn-Mower Handle, of which the following is a specification.

My invention relates to an improvement in the handle of a lawn mower and consists of novel means for connecting the cross bar or grip thereof with the tongue of the same, whereby the connection of said members is strong and durable, and possesses other advantages as will be hereinafter set forth.

The invention is satisfactorily illustrated in the accompanying drawing, but the important instrumentalities thereof may be varied, and so it is to be understood that the invention is not limited to the specific arrangement and organization shown and described.

Figure 1 represents a transverse section on line $x$—$x$ Fig. 2 of the portion of a lawn mower handle embodying my invention. Fig. 2 represents a partial side elevation and a partial section on line $y$—$y$ Fig. 1. Fig. 3 represents a top plan view of a portion thereof. Fig. 4 represents a bottom plan view thereof.

Similar letters of reference indicate corresponding parts in the figures.

Referring to the drawings: A designates the tongue of the handle of a lawn mower, and B designates the cross bar or grip thereof, it being noticed that on the upper end of the tongue is a tenon which enters an opening or mortise centrally in the cross bar and is wedged to the wall of said opening as a means of connection of said cross bar and tongue while the upper end of the tongue proper abuts against the under side of said cross bar forming primarily a strong connection of said tongue with said cross bar.

It will be noticed that the sides of the tenon and the walls of the mortise are inclined so as to form a dovetailed joint or connection for said cross bar and tongue, thus increasing the holding action of said bar and tongue one on the other, this being assured further by the spreading or expansion of said tongue due to the inserted wedges employed to effect the same.

C designates angular brackets on the opposite sides of the upper end portion of the tongue A, the limbs E of said brackets being seated against the underside of the handle and the limbs D thereof being seated against the sides of said upper end portion of said tongue. The angles F of the brackets are coincident in position with the angles or joints G of the tongue and cross bar and fit closely against the same, as most plainly shown in Fig. 1.

Bolts H are passed through the limbs E and tongue A and provided with tightening nuts J, the heads K of said bolts bearing against one of said limbs E, and said nuts bearing against the opposite limb E thus firmly clamping the brackets to the tongue.

Bolts L are passed through the cross bar B at a right angle to the bolts H and likewise through the limbs D of the brackets C, they being provided with tightening nuts M, the heads N of said bolts bearing against what may be termed the top of cross bar and said nuts bearing against the under sides of said limbs E, thus firmly clamping the brackets to said cross bar and consequently clamping said cross bar and tongue to each other, said cross bar and tongue being of wood and said brackets of metal, consequently the connection of the tongue with the cross bar or vice versa is of most firm and durable nature.

Attention is directed to the fact that the heads N of the bolts are segmental or curved, so as to accord in a measure with the curvature of the portions of the crosshead about the central mortise thereof which they embrace and form continuities of said curvature avoiding objectionable obstructions on said cross bar and their ends are tapering and pointed so as to engage with the wood of the cross bar and so assist in causing the heads to take firm hold of the latter, thus positively and effectively gripping the same. This gripping is increased by the concave upper faces of the upper limbs of the brackets and the concave face of the under faces of the heads of the bolts, whereby said heads and limbs embrace the contiguous portions of the cross bar opposite to each other and so close around the same, and as the length of their hold on said portions of the cross bar is vastly increased, when they are tightened by the nuts, they embracingly jam said portions in directions opposite to each other, the effect of which is evident. Furthermore, the cross bar is seated on the brackets and so sustained and braced thereby that it is well adapted to endure the strain or thrust to which it is subjected in pushing the lawn mower and the draft in pulling the same, the numerous advantages presented rendering the handle stronger, stiffer and of greater durability without materially increasing its weight and strength.

The brackets and bolts may be readily removed and replaced, a feature of importance, should either of the parts of the device be fractured, broken or worn out.

As the brackets and heads of the bolts are independent of each other they are adapted to be fitted to cross bars of somewhat different thicknesses, and operate in their circular-embracing and squeezing actions on such cross bars.

Having thus described my invention what I claim as new and desire to secure by Letters Patent, is:—

In a handle of the character stated, a tongue and a cross bar, the latter having therein a mortise, and the former having thereon a tenon adapted to occupy said mortise, angular brackets at the under places of junction of said tongue and bar, vertically and horizontally-arranged bolts passing respectively through each of the limbs of said brackets and through said tongue and cross bar, and tightening devices on said bolts, the horizontal limbs of said brackets and the heads of the vertical bolts being segmental in opposite directions, and adapted to embrace respectively the top, side and bottom portions of said cross bar and to be oppositely tightened, said heads being on the top portion of said cross bar.

WALTER E. GRAHAM.

Witnesses:
N. F. CRESSMAN,
JAS. L. CHRISMAN.

---

Copies of this patent may be obtained for five cents each, by addressing the "Commissioner of Patents, Washington, D. C."